United States Patent [19]

Musil

[11] Patent Number: 4,996,750
[45] Date of Patent: Mar. 5, 1991

[54] WIRE BELT FASTENER

[75] Inventor: Edward C. Musil, Lyons, Ill.

[73] Assignee: Flexible Steel Lacing Company, Downers Grove, Ill.

[21] Appl. No.: 371,214

[22] Filed: Jun. 26, 1989

[51] Int. Cl.[5] ............................................. F16G 3/02
[52] U.S. Cl. .................... 24/33 C; 24/33 B
[58] Field of Search .................. 24/33 B, 33 C, 33 R; 474/257, 256

[56] References Cited

U.S. PATENT DOCUMENTS

| | | | |
|---|---|---|---|
| 2,245,947 | 6/1941 | Warby | 24/39 |
| 2,490,195 | 12/1949 | Beach | 24/33 B |
| 3,107,406 | 10/1963 | Tebb | 24/33 C |
| 3,153,827 | 10/1964 | Phillips et al. | 24/33 C |
| 3,327,358 | 6/1967 | Schick | 24/23 |
| 3,962,754 | 6/1976 | Stolz | 24/33 B |
| 4,023,239 | 5/1977 | Stolz | 474/257 |
| 4,060,877 | 12/1977 | Schick | 24/33 B |
| 4,315,349 | 2/1982 | Stolz | 24/33 C |
| 4,582,505 | 4/1986 | Stolz | 474/255 |
| 4,625,369 | 12/1986 | Musil | 24/33 B |
| 4,653,156 | 3/1987 | Stolz et al. | 24/33 R |
| 4,708,558 | 11/1987 | Musil | 24/33 C |

FOREIGN PATENT DOCUMENTS

| | | | |
|---|---|---|---|
| 424405 | 2/1935 | United Kingdom | 24/33 C |
| 1003512 | 9/1965 | United Kingdom | 24/33 B |
| 1603544 | 5/1978 | United Kingdom | |
| 2092031 | 8/1982 | United Kingdom | |

*Primary Examiner*—Victor N. Sakran
*Attorney, Agent, or Firm*—Fitch, Even, Tabin & Flannery

[57] ABSTRACT

A wire belt fastener is formed from a piece of wire to have a wire body having a pair of arms joined by a U-shaped hinge pin section. The ends of the wire are flattened to form wide areas having grooves to receive the head and the bent ends of a staple. The fasteners are aligned in a juxtaposed array by a connector wire or rod extending normal to the arms and spanning across a series of belt fasteners to space them evenly to receive interdigitated hinge loops of another array of belt fasteners. A belt stop comprising a projecting piece of wire is secured to an inner surface of one arm of the wire belt fastener to be abutted by the cut belt end to limits its insertion into the gap between the arms of the wire belt fastener. To reduce the lateral width of the belt fasteners and to place more metal in the splice, the wire cross-section at the hinge loop is substantially oblong with flat faces of adjacent, intermeshed fasteners being side by side. The wire body is oblong in shape except for the flattened ends without having to cut away metal from the wire body and scraping the severed metal. When bending the wire into a U-shape, the interior hemispherical surface becomes wider than the outer hemispherical surface at the hinge loop.

5 Claims, 2 Drawing Sheets

WIRE BELT FASTENER

BACKGROUND OF THE INVENTION

The present invention relates to wire belt fasteners for use in connecting adjacent belt segments of, for example, a conveyor belt.

Hinge belt fasteners are extensively used for joining belt segments of an endless conveyor belt. Among the various types of fasteners are plate-type fasteners with upper and lower plates joined by a pair of arcuate loops and secured to a belt end with rivets or staples. As shown in U.S. Pat. Nos. 4,625,369 and 3,962,754, the plate fasteners are disposed on opposed belt ends with the arcuate loops intermeshed to define a series of aligned loops for receiving a connecting hinge pin. Some belt fasteners, such as wire fasteners, have pointed or staple-like ends to pierce the belt and form a loop extending from the belt end. A series of these belt fasteners may be secured to each end of a belt and intermeshed to provide a passage for a connecting hinge pin.

The plate fasteners described in U.S. Pat. Nos. 4,625,369 and 3,962,754 are formed from a flat sheet of metal, such as steel, in a series of steps such as cutting, punching and bending. A belt stop or abutment finger may be included with the fastener; and when formed with the fastener, it is simply a bent portion of one of the plates, generally at a right angle to that plate, and directed toward the other plate. A further example of a belt fastener, such as disclosed in U.S. Pat. No. 4,060,877, is made from a sheet metal, which is strip formed in a U-shaped arrangement having folded sides with ends which are pierced, flattened portions to receive a staple to be driven through the belt. The base of the U-shaped joint or loop, when cooperating with a series of interdigitated loops, provides a hinge pin passage to receive a hinge pin.

The present invention is directed to wire fasteners; U.S. Pat. No. 3,153,827 and U.K. Patent 2,092,031 each discloses wire fasteners which are fabricated from a wire blank. In U.S. Pat. No. 3,153,827, a circular cross section wire blank is formed into a U-shape and the ends of the wire are flattened and pierced to receive the legs of a staple, which is used to join each leg of the staple to the belt end. The present trend is to increase the belt tension on conveyors to higher and higher tensions, which must be accommodated by the wire fasteners, if they are to compete with flat plate or folded plate fasteners which provide large cross-sections of metal at the hinge pin area of the splice. If circular wire cross-sections of wire fasteners are interleaved at the hinge splice and are abutted side by side, an upper and lower cusp of space is present at which there is no metal. That is, the tangentially abutted, round wire fasteners will have substantially less metal at the splice than will a flat plate or folded plate fastener of the same lateral width. In the folded plate belt fasteners the metal has been gathered into a U-shape or the metal has been folded over onto itself to provide more metal and hence, more strength is achieved at the splice. The present invention is directed to avoiding the complex folding and forming of U-shaped cross-sections from a plate and to using a piece of wire and wire fasteners configured from wire in a manner which allows closer spacing together of the wire fasteners than the spacing achieved when using the circular cross-section wire fasteners of U.S. Pat. No. 3,153,827. With the present invention, this closer spacing allows more metal at the splice to accommodate the higher tension loads now being used.

Wire belt fasteners are produced on a large scale and must be produced economically in order to be competitive and a viable product in competition with other belt fasteners currently on the market. In the published British patent application 2,092,031, a round wire is used as a stock and it is cut on its vertical sides at the U-shaped hinge portions to provide flat vertical walls. The present invention eliminates such a cutting operation and the amount of metal which is cut from the blank and which will end up as scrap metal. Another objective of the invention is to produce belt fasteners which are substantially identical in shape with reduced tolerance variations so that the belt fasteners and staples used therewith may be easily and readily applied with automatic equipment. A still further objective of the invention is to provide wire belt fasteners with belt stops to limit belt insertion between the arms of the belt fastener.

BRIEF DESCRIPTION OF THE DRAWINGS

In the Figures of the drawing, like reference numerals identify like components and in the drawing.

DETAILED DESCRIPTION OF THE PREFERRED EMBODIMENT

Figure 5:
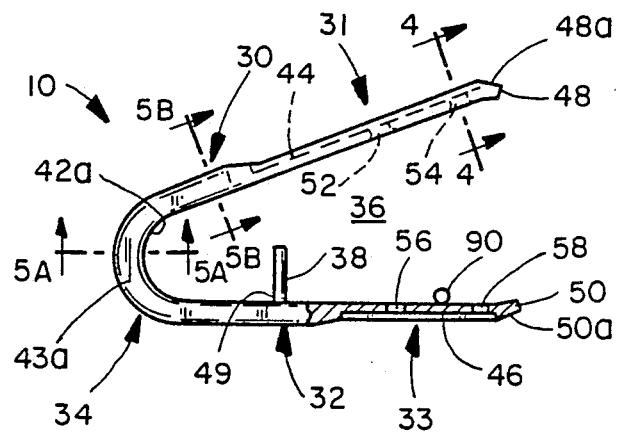
FIG. 5 is a side view of a fastener with a belt stop, in a formed arrangement.
Figure 6:
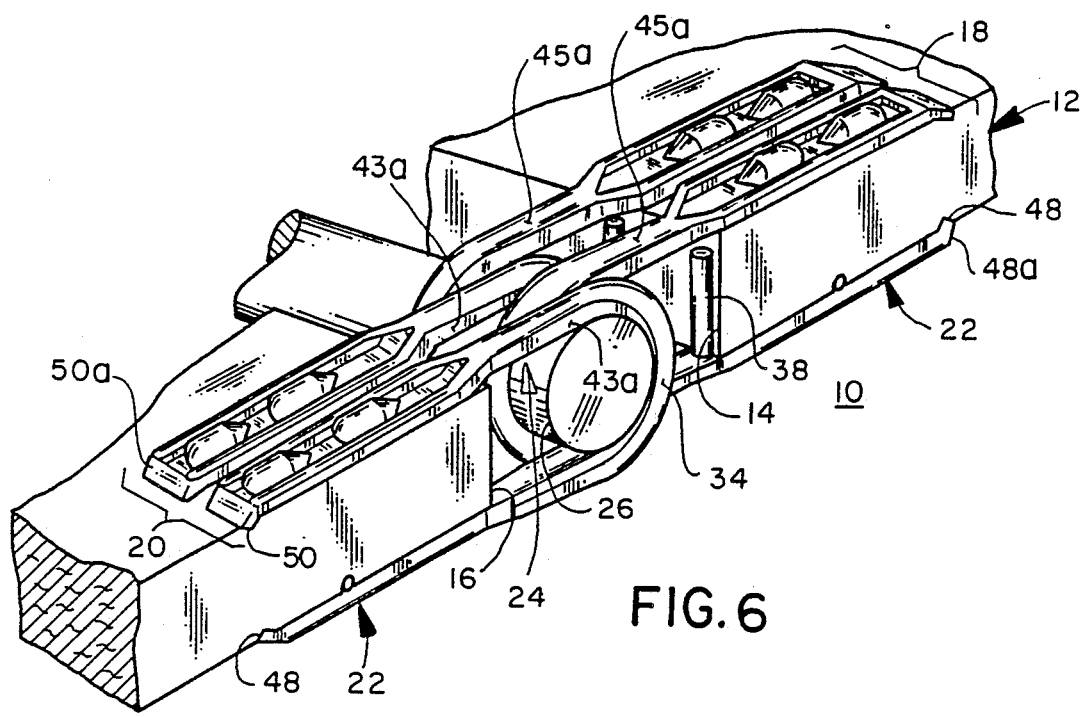
FIG. 6 is a partial perspective view of an as-connected array of fasteners joining opposed belt ends.

As shown in the drawings for purposes of illustration, the wire belt fastener 10 is made from a piece of wire 11 with flattened ends 31 and 33 (FIG. 2), which have elongated grooves 44 and 46 therein for receiving a staple head 78 (FIG. 8) and bent ends 80, 82 of a staple 72 used to secure the belt fastener to a belt end 12, as shown in FIG. 6. The flattened ends 31 and 33 are pierced by holes 52, 54 in the groove 44 and holes 56 and 58 in the groove 46. The groove 44 is longer than the groove 46 to receive the bent over ends 80 and 82 of the staple. The wire fastener, which is made from the piece of wire 11, which is formed with the flattened and grooved ends, which are pierced with the holes, prior to the wire being bent into its finished U-shaped configuration shown in FIG. 5 in which a curved hinge loop section 34 joins a first or upper arm 30 having the large groove 44 to a second or lower arm 32 having the smaller groove 46.

Figure 1:
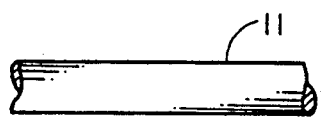
FIG. 1 illustrates a piece of wire to be formed into the wire belt fastener in accordance with a preferred embodiment of the invention.
Figure 1A:
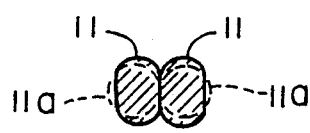
FIG 1A is a diagrammatic view showing a reduced lateral width for a pair of adjacent solid line, oblong, cross-sectioned wires relative to a pair of adjacent, circular, cross-sectioned wires.

In accordance with the present invention, more metal is placed at the splice and the wire fasteners may be positioned closer to each other than circular cross-section wire fasteners to improve the tension load carrying capability of the splice. More specifically, the illustrated wire cross-section at the hinge loop section, prior to bending into the U-shaped configuration, is shown in FIG. 5B and is oblong in shape with upper and lower hemispherical surfaces 40 and 42 joined to vertical sidewalls 43 and 45 extending between the sidewalls. This oblong shape may be achieved by taking a circular cross-section wire shown in dotted lines in FIG. 5B and running it between paired drawing rollers which flatten the wire to have a reduced thickness between vertical sidewalls 43 and 45 which thickness is substantially less than the diameter of the wire 11a, as illustrated in FIG. 5B. The closer spacing of adjacent intermeshed hinge loops, which have a substantially oblong cross-section at the hinge pin loop 34, can be understood from a comparison illustrated in FIG. 1A in which two oblong cross-sectioned wires 11 are abutted in solid lines and in which two circular cross-section wires 11a are abutted and have a significantly wider lateral width equal to twice their diameters. Thus, the wire fastener body is oblong throughout its length except for its flattened ends 31 and 33 and the oblong shape is achieved without cutting away metal from the sides of the wire body as is disclosed in the aforesaid British published application.

Figure 3:
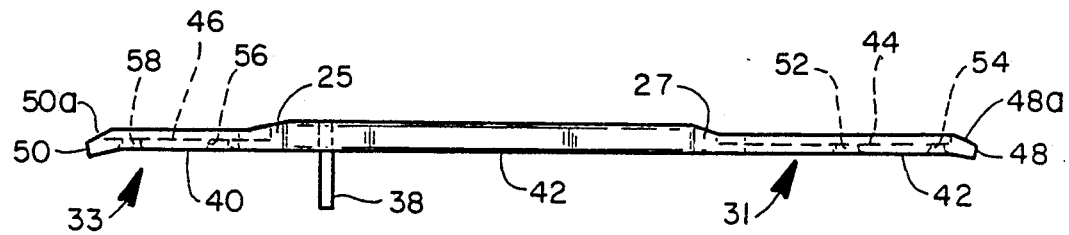
FIG. 3 is an enlarged side view of the belt fastener of FIG. 2.
Figure 5A:
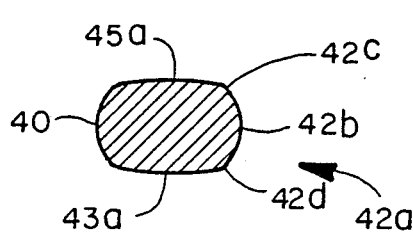
FIG. 5A is an enlarged cross-sectional view taken substantially along the line 5A—5A of FIG. 5 and showing the cross-section of the wire body at the hinge loop section.
Figure 5B:
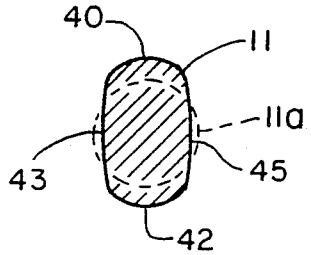
FIG. 5B is an enlarged cross-sectional view taken substantially along the line 5B—5B of FIG. 5 with a circular cross-section wire added in phantom lines.
Figure 7:
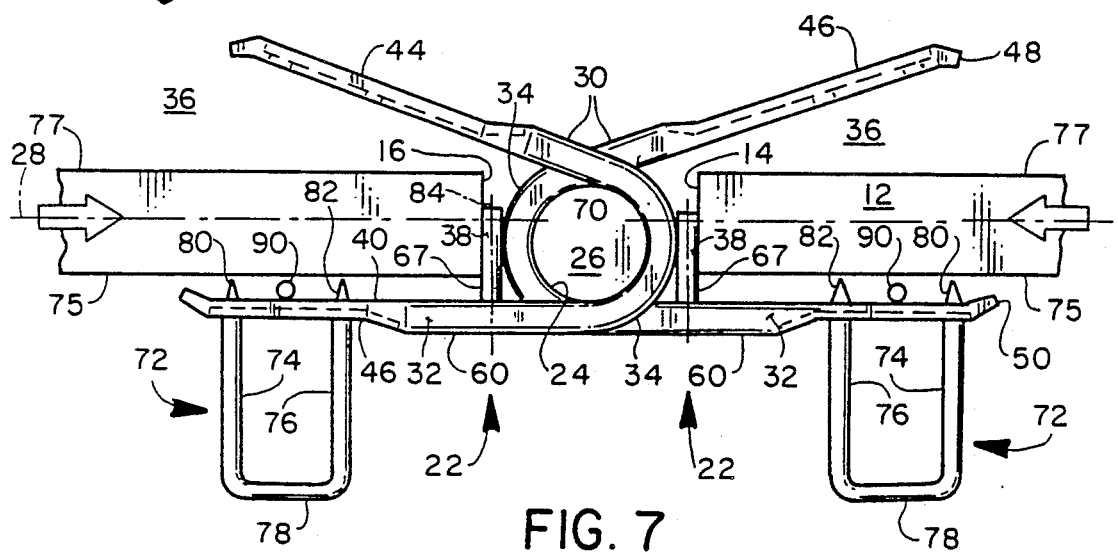
FIG. 7 is a side view of the fasteners ready to be secured to a belt.
Figure 8:
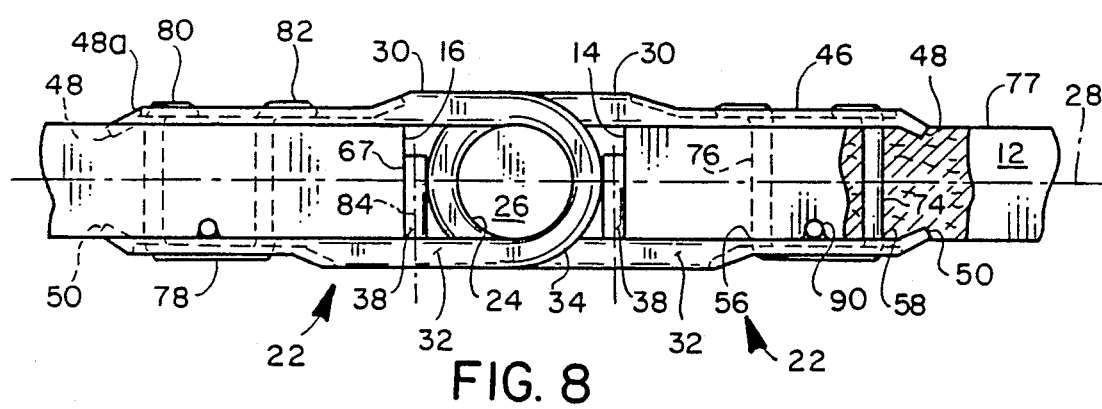
FIG. 8 is a side view of fasteners intermeshed with opposite belt end fasteners.

When the oblong wire cross-section shown in FIG. 5B is bent around a forming mandrel, the oblong cross-section of FIG. 5B is distorted with the lower, internal surface of the wire becoming fatter and wider as metal is displaced with the bending of the wire from a straight shape shown in FIG. 3 into the final U-shape shown in FIG. 5. The cross-section in the arms outside of the hinge loop section 34 is that of the wire and is shown in FIG. 5B. The wire 11 may be formed into this oblong cross-section by flattening rollers as above-described or the wire may be initially drawn into this shape and purchased as an already oblong cross-sectioned wire 11. As best seen in FIG. 5A, the final cross-section at the location of engagement of a hinge pin includes the flattened outwardly flaring vertical sidewalls 43a and 45a extending toward the bottom wall 42a. The bottom wall 42a has a flat central wall section 42b joined to curved sections 42c and 42d which are joined to the sidewalls 43a and 45a. The hinge loop section is bent so that the bottom wall 42a engages the hinge pin 26, as shown in FIGS. 6, 7 and 8. This reshaping from a round wire to the broadly oblong shape allows the interleaved hinge pin sections 34 to be spaced closer together than would circular cross-sectioned wires and hence, more metal is available across the splice and against the hinge pin.

Figure 2:
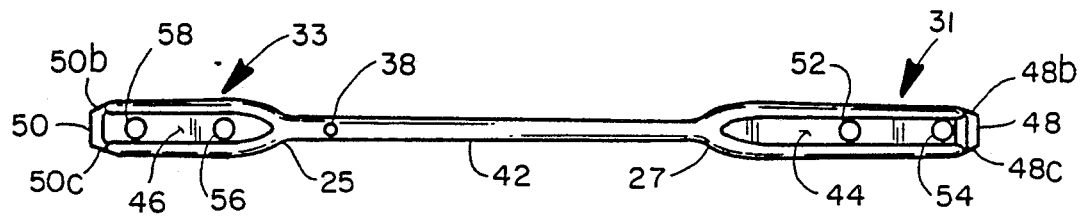
FIG. 2 illustrates a top plan view of a belt fastener prior to bending into a U-shape.

In accordance with another important aspect of the invention, the wire fastener 10 may be provided with a belt stop 38 to limit the depth of insertion of the cut belt end 12 into a gap or space 36 between the upper and lower arms 30 and 32. The preferred belt stop 38 is a vertical piece of wire which is welded or otherwise fastened to a belt leg at juncture 49. The illustrated belt stop has an upper free end in the gap 36 and preferably has a diameter smaller than the cross-sectional width of the bottom wall to which the belt stop is welded at the juncture 49. Preferably, the belt stop 38 is welded to bottom surface 42 of the wire cross-section prior to bending of the wire, as illustrated in FIGS. 2 and 3 in which the belt stop is shown projecting downwardly at a right angle to the wire body.

The ends of the wire body are bent downwardly to form tip or lip ends 48 and 50 to dig slightly into the belt surface as shown in FIGS. 6 and 8. Also, the tip ends 48 and 50 have slanted or inwardly inclined side edges 48b and 48c and 50b and 50c, as best seen in FIG. 2. Also, top surfaces 48a and 50a (FIG. 5) of the tips are slanted downwardly and forwardly toward the belt surfaces.

Figure 4:
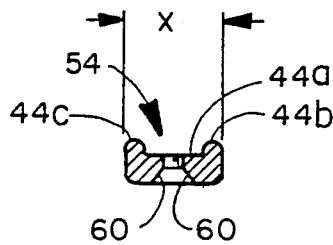
FIG. 4 is an enlarged cross-sectional view taken along the line 4—4 in FIG. 5.

As best seen in FIG. 4, the cross-section through the flattened end 31 having the groove 44 shows that the groove has a bottom wall 44a and upstanding sidewalls 44b and 44c facing upwardly or outwardly to receive the staple ends. The points on the ends of the staples are guided through receiving hole 54 by a countersunk hole or surface having inwardly inclined walls 60. Thus, if there is misalignment the staple point will hit the larger diameter, inclined surface 60 and slide therealong into and through the hole 54.

In the drawings, FIG. 6 illustrates an exemplary fastener assembly in perspective with a plurality of finished connectors used to join conveyor belt ends. In FIG. 6, an assembly 10 has a belt 12, which may be a conveyor belt; and, a first set 18 and a second set 20 of individual connectors or fasteners 22, which are mounted on first belt end 14 and second belt end 16, respectively. The individual connectors 22 of first set 18 mate or intermesh with the individual connectors 22 of the second set 20. The flattened sides 43a of one set of belt fasteners are closely positioned adjacent to the flattened sides 45a of the other set of belt fasteners at the hinge loop sections 34 to provide more metal at the splice than will round cross-section wire fasteners. The intermeshed connectors 22, illustrated in FIGS. 6, 7 and 8, cooperate to provide a hinge passage or aperture 24 for a hinge or connector pin 26 to couple the first belt end and second belt end, thus forming a continuous belt. The as-assembled first and second connector sets 18, 20, securing belt end 12 are coupled by hinge pin 26, which is illustrated in FIG. 8 along longitudinal axis 28 of belt 12. It is appreciated that the connectors at the outer edge of the assembled connection will only be in contact with one of the opposed belt end connectors 22. These Figures illustrate the application and usage of this type of connector or fastener 22.

The individual wire connectors 22 have identical structures, and thus the formed or shaped elements of only a single connector will be described in detail. A side view of an individual preformed connector body 22 is illustrated in an open or unassembled condition in FIG. 7, and includes the upper, or first arm 30 and the lower, or second arm 32 connected by the arcuate hinge loop 34. The individual connector 22 is formed in a U-shaped or forked shape with a gap 36 between the upper and lower arms 30, 32; and the positive belt stop 38, shown as a pin, is mounted on inner surface or bottom face 42 of lower arm 32 and protrudes into gap 36 in a normal or vertical manner. It is appreciated that stop 38 may be mounted on inner surface or bottom face 42 of upper arm 30 in a normal or perpendicular manner. The utilization of a pin or cylindrical shape is merely illustrative and not a limitation, as it can be appreciated that a stop with a cross section other than circular could also have been utilized as a stop means.

In the arrangement of these sets, the several extending stops 38 of connectors 22 will be aligned in a general straight line. The reach back distance, that is, the position of stops 38 from the fastener ends 48 or 50, is the depth of belt penetration into gap 36 by the belt end which abuts these belt stops.

The belt end 14 (FIG. 7) is inserted in gap 36 of first connector set 18 and contacts the stops 38 thereof at a belt butt end surface 67. Second belt end 16 is inserted in gap 36 of second connector set 20 and contacts the stops 38 at belt butt end surface 67. The connector sets 18 and 20 have their hinge loops 34 intermeshed to form a hinge aperture 24 for hinge pin 26. The second set of hinge loops has interior surfaces 42a abutting the hinge pin 26 on its right side. Similarly, the hinge pin's left side abuts the interior surface of the first set of hinge pin loops, and the exterior extremity surfaces 84 of the first set of fastener hinge pin loops nearly abuts the second belt end 16 which is abutting the second belt stop 38 on the second set of belt fasteners.

The various arrays or sets 18 and 20 of connectors 22 in the Figures are maintained in their ranked or aligned positions, especially as illustrated by the maintenance of stops 38 in the aligned fashion, by the connecting means, which is shown as a rod or wire 90, secured to one of bottom surfaces 42 of the connector arms 30 and 32. In FIGS. 7 and 8, the wire 90 is positioned between apertures 56 and 58 of lower arm 32 on inner surface 42, which is by way of illustration and not limitation. Wire or rod 90, which stretches across and is affixed to the faces of the aligned array of several connectors 22 to maintain them in this aligned position, is stiff enough to maintain them in their relative alignment, but may be readily broken to provide the number of belt fasteners needed for a particular belt width. Alternatively, the wire or rod 90 may similarly be positioned in proximity to stop 38, such as between belt stop 38 and aperture 56, as illustrated in FIG. 5. Thus wire 90 may be affixed along the arm inner surfaces 42 in any location which does not interfere with the structure and operation of the connectors 22. The wire 90 spaces and holds the belt fasteners in a transverse array so that the hinge loops of one set of belt fasteners are spaced evenly for intermeshing with an opposing set of hinge loops 34 of the other belt fasteners. As best seen in FIGS. 7 and 8, each hinge loop 34 has its arcuate surface almost abutting a butt endwall 67 or 70 of a belt end and this maximizes the reach back distance for the belt fasteners.

What is claimed is:

1. A belt fastener formed from a bent piece of wire for being stapled to a belt, said belt fastener comprising:
    a wire body of substantially oblong shape bent into a generally U-shape,
    an upper arm on the U-shaped body having a staple receiving groove at a free end thereof,
    a lower arm on the U-shaped body having a staple receiving groove at a free end thereof and spaced from the other arm by a gap to receive a belt end between the upper and lower arms,
    a U-shaped hinge pin section on the wire body joining the first and second arms and adapted to receive a hinge pin therein,
    said wire body having flattened ends providing a wider cross-section at which the grooves are located than the remaining cross-section of the arms,
    said flattened ends each having holes therein with the grooves to receive legs of a staple joining the wire belt fastener to a belt,
    the U-shaped hinge pin section having a cross-section that is substantially oblong in shape having flattened sidewalls to be positioned adjacent other intermeshed fasteners,
    said wire body having a continuous oblong shape except at the flattened ends.

2. A belt fastener in accordance with claim 1, the interior wall on the hinge pin cross-section having a flat central section and a pair of curved sections extending from the flat central section to the flattened sidewalls.

3. A belt fastener in accordance with claim 1 including a belt stop in the form of a wire projecting inwardly from one arm toward the other arm to be abutted by a belt end.

4. A belt fastener in accordance with claim 1 in which an interior surface on the U-shaped hinge pin section for engaging the hinge pin is wider than the exterior surface at the U-shaped hinge pin section.

5. A belt fastener in accordance with claim 1 including a belt stop secured to one of the arms and projecting inwardly toward the other of the arms to be abutted by a belt end to stop insertion of a belt end between the arms.

* * * * *